Aug. 29, 1939.     E. J. SIMON     2,170,835

NAVIGATIONAL SYSTEM

Filed Nov. 10, 1933     7 Sheets-Sheet 1

POLAR DIAGRAM OF 2-LOOPS DISPLACED 90°

POLAR DIAGRAM OF 2-LOOPS DISPLACED 60° AND 120°

2-CARDIOIDS — 2-LOOPS DISPLACED 90°

INVENTOR
EMIL J. SIMON
BY
ATTORNEY

Aug. 29, 1939.   E. J. SIMON   2,170,835
NAVIGATIONAL SYSTEM
Filed Nov. 10, 1933   7 Sheets-Sheet 2
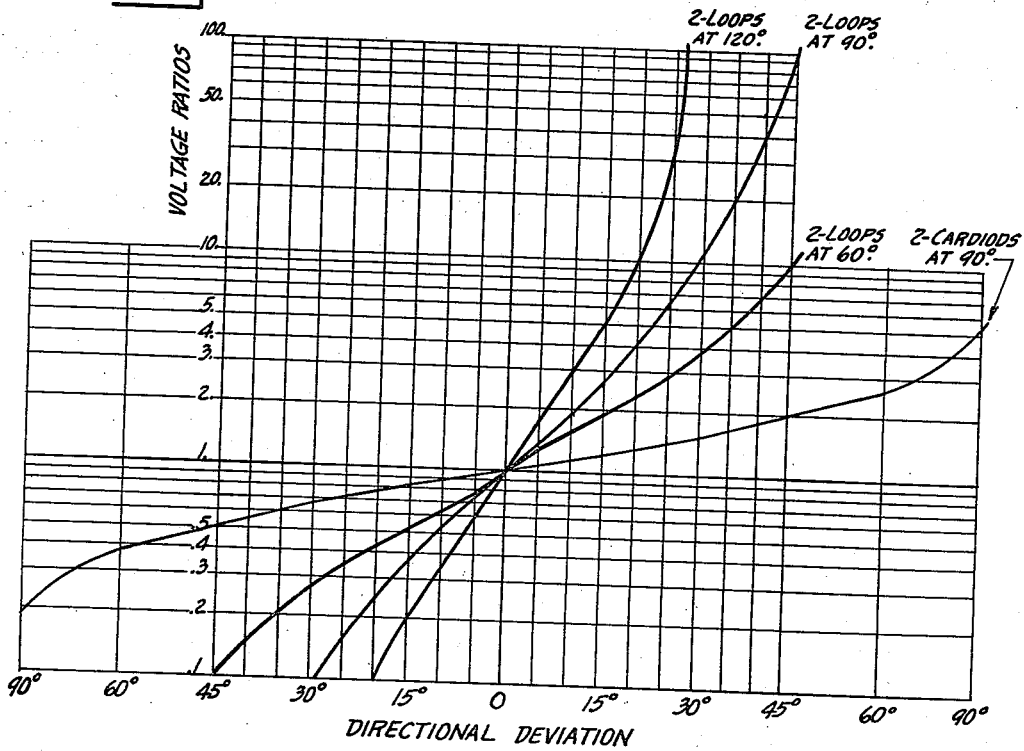
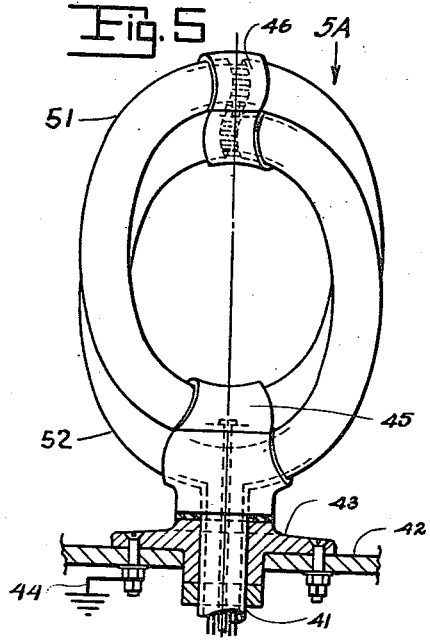
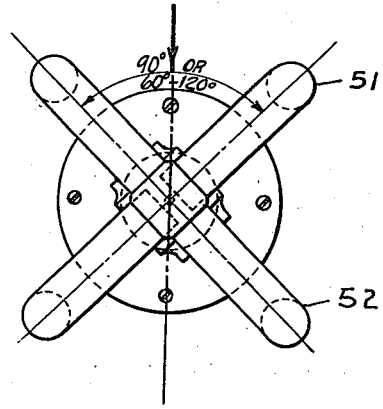
INVENTOR
EMIL J. SIMON
BY
ATTORNEY INVENTOR
EMIL J. SIMON
BY
Samuel Ostrolenk
ATTORNEY

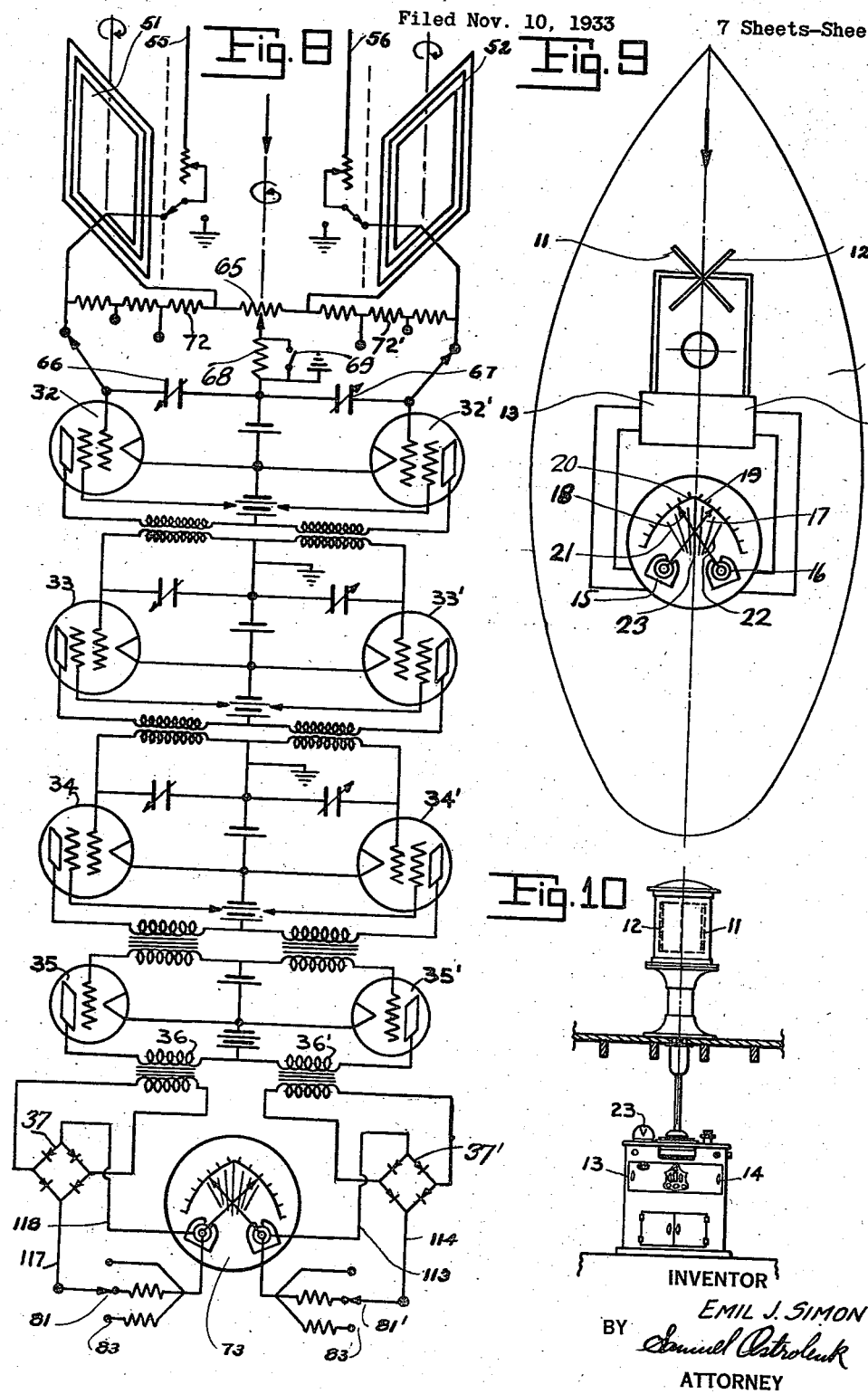

Aug. 29, 1939.  E. J. SIMON  2,170,835
NAVIGATIONAL SYSTEM
Filed Nov. 10, 1933   7 Sheets-Sheet 5

PORT  STARB'D.

INVENTOR
EMIL J. SIMON
BY
ATTORNEY

Aug. 29, 1939.  E. J. SIMON  2,170,835
NAVIGATIONAL SYSTEM
Filed Nov. 10, 1933      7 Sheets—Sheet 6
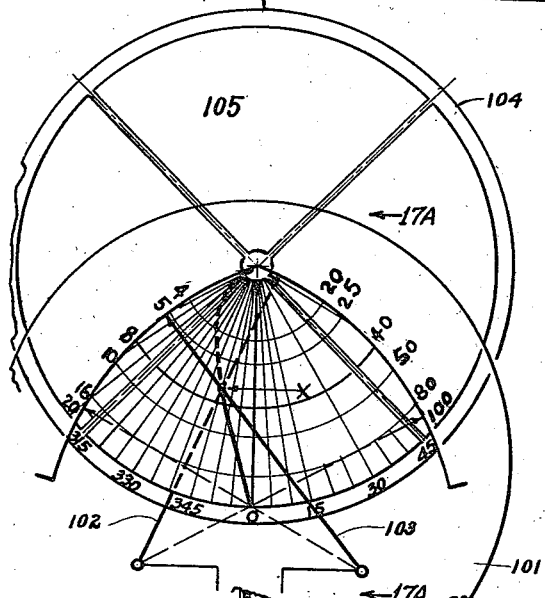
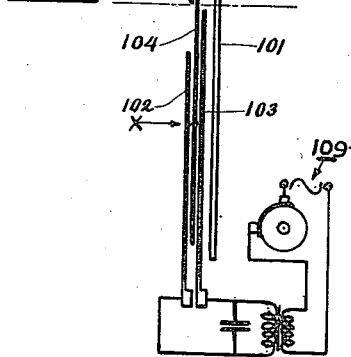
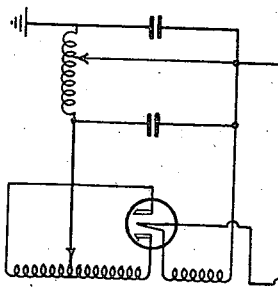
Inventor
EMIL J. SIMON
By his Attorney

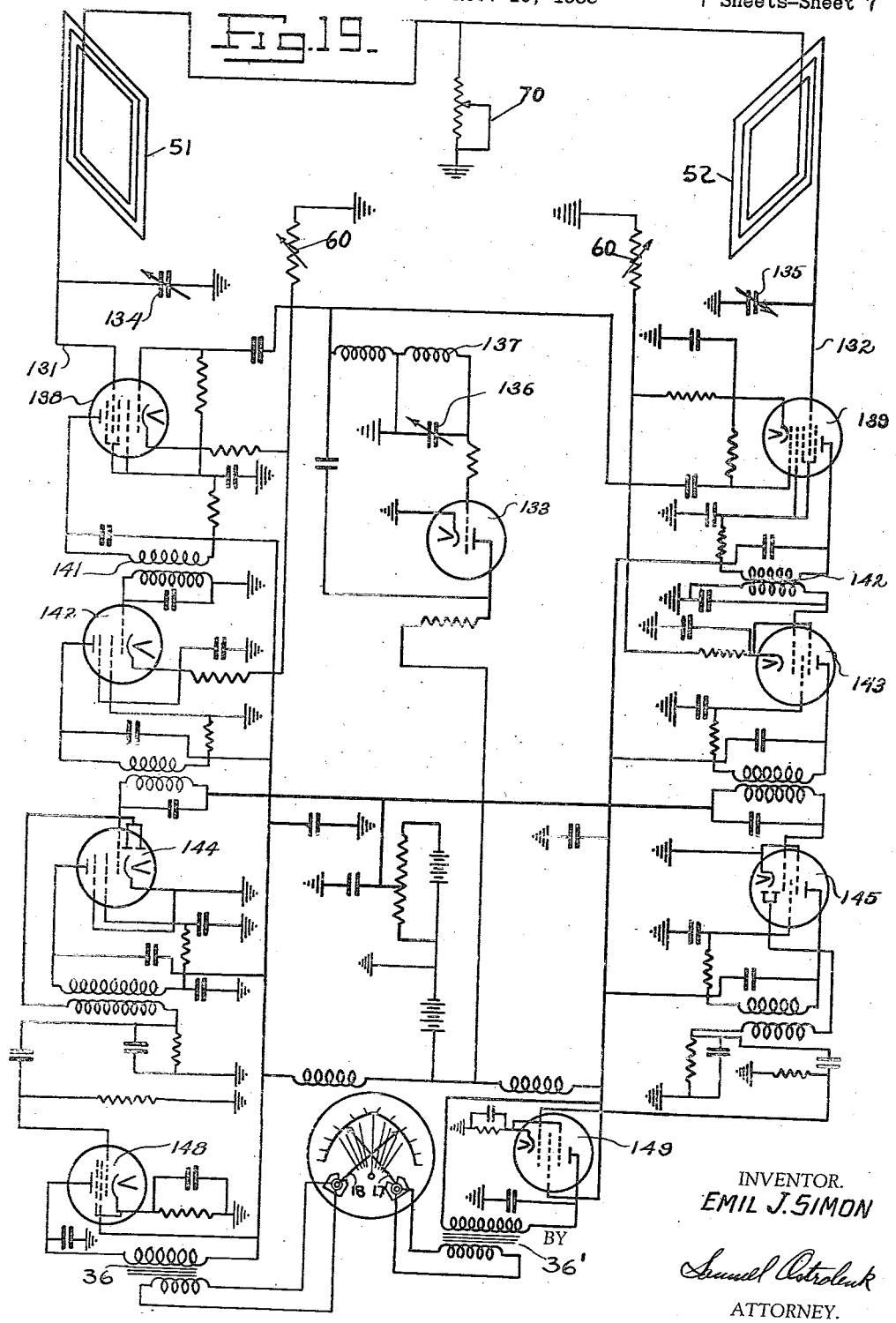

Patented Aug. 29, 1939

2,170,835

UNITED STATES PATENT OFFICE 2,170,835

NAVIGATIONAL SYSTEM

Emil J. Simon, New York, N. Y., assignor to Jennie S. Simon

Application November 10, 1933, Serial No. 697,371

29 Claims. (Cl. 250—11)

This invention relates to novel apparatus for and methods of operating radio receiving systems, and more particularly to novel apparatus for and methods of operating directional receiving systems for navigating crafts on land, on water, and in the air.

Directional receiving systems are commonly provided with a directional antenna, such as a vertical rotatable loop antenna connected through a radio receiver to an indicating device of the audible or visual type. In practice, the loop is manually rotated until a minimum or maximum response is received from a known transmitting station or beacon.

This method of determining direction requires an experiment; namely, the rotation of the loop until the position of minimum or maximum response is definitely located. Both time and skill are required to thus obtain an accurate bearing.

In aircraft navigation, the time thus consumed constitutes a serious disadvantage if the craft is in charge of a single pilot whose entire attention should be directed to the piloting of the ship and especially is this true at crucial moments when bearings are most likely to be needed.

Furthermore, evidence that the craft is on or off its course is obtained only after the completion of the experiment. In a fast moving craft this fact may not become known until long after the vessel has left its course, depending upon the frequency of use of the direction finding apparatus.

Direction finding systems on aircraft are frequently used as a "homing" device; that is to say, to head the ship continually toward a radio transmitting beacon located at the point of destination. For this purpose continuous and not merely intermittent indications are desirable, and a quantitative indication of the deviation of a ship from its predetermined course is extremely important. Such quantitative indication is not obtainable with the ordinary "homing" or "left-right" type of indicating devices.

Moreover, navigational radio systems usually have been confined to the determination of the direction of a beacon from a craft, either with respect to the keel-line of the craft or to true or magnetic north. The present invention provides a complete radio navigational system that not only indicates the direction and distance of the beacon with respect to a moving craft, but it may also indicate and record the ship's course, position and progress by making a continuous indication or mark of its position on a chart with respect to a single radio beacon and by indicating on a chart the rate of speed of the craft over water or ground. It may also provide means for automatically maintaining the craft on a predetermined course, independently of drift, tide, etc.

Accordingly, an object of this invention is to provide novel methods of and means for continuously and automatically indicating the course of a moving vessel with respect to a fixed radio beacon; to provide novel means to indicate the relative or actual distance the vessel has traveled toward or away from a radio beacon in any given length of time; to provide novel means responsive to radio signals for automatically indicating the speed and drift of an aircraft over the earth; to provide novel means to automatically control the craft's rudder by the signals received from a radio beacon; to provide a combination of automatic direction finder and compass; and to provide a navigation chart in combination with an automatic direction finder and apparatus for and methods of automatically recording the vessel's course thereon.

There are other objects which together with the foregoing will appear in the detailed description of the invention given in connection with the drawings which follow:

Figure 4 shows curves indicating the directional deviation corresponding to various voltage ratios when loops are displaced at different angles;

Figure 5 is a schematic showing of one manner of mounting my loops;

Figure 5a is a plan view of Figure 5;

Figure 8 is one form of circuit diagram used in carrying out my invention;

Figure 9 is a schematic view of the system used in carrying out my invention when installed on a ship;

Figure 10 is a schematic view showing one manner of mounting the apparatus of my invention on a ship;

Figure 17 is a diagrammatic view of a chart on which a record is automatically made of the course of the vessel;

Figure 17a is a detail showing the manner of mounting the pointers in the arrangement shown in Figure 17;

Figure 18 is a modified form of circuit diagram in which two superheterodyne amplifiers having a common oscillator are operated from an alternating current power source; and Figure 19 is a further modified form of circuit diagram of a superheterodyne circuit with electronic coupling and linear amplification operated from a direct current source.

Referring now more specifically to Figure 9, two directional antennae 11 and 12, preferably of the loop type, angularly displaced with respect to each other, are fixedly mounted in vertical planes in any suitable manner on any desired type of craft, as for example, the diagrammatically illustrated vessel 10. The loops are in such a position that a line bisecting one of the angles formed by the intersection of the planes of the two loops is coincident with or parallel to the keel-line of the vessel.

In the illustration of the invention, the two loops intersect at their vertical axes but, as will be apparent hereinafter, the loops need not intersect at all. For example, the loops may be placed to form any desired angle, but if this angle is other than a right angle, the loops should be sufficiently spaced so as to avoid inductive reaction upon each other.

I have found, in practice, that for each angular relation, the loops may be spaced so as to have no inductive reaction on each other. In each instance, however, the loops should be so placed with respect to each other that their forward facing angle of intersection, or of the intersection of the extensions of their planes, forms a predetermined fixed angle. As hereinafter explained, this may be any angle greater than 20°. The choice of the angle depends upon the results to be achieved. The larger the angle between the loops, the greater becomes the sensitivity of the device to angular deviation; but the useful arc of operation becomes narrower and the relative signal strength becomes less. This will be more fully explained hereinafter.

Under such condition, each loop will absorb an equal amount of signal energy emanating from a transmitting source, if the source is located on a line bisecting one of the angles formed by the two loops, and will impress equal potentials upon their respective amplifiers.

Figure 6:
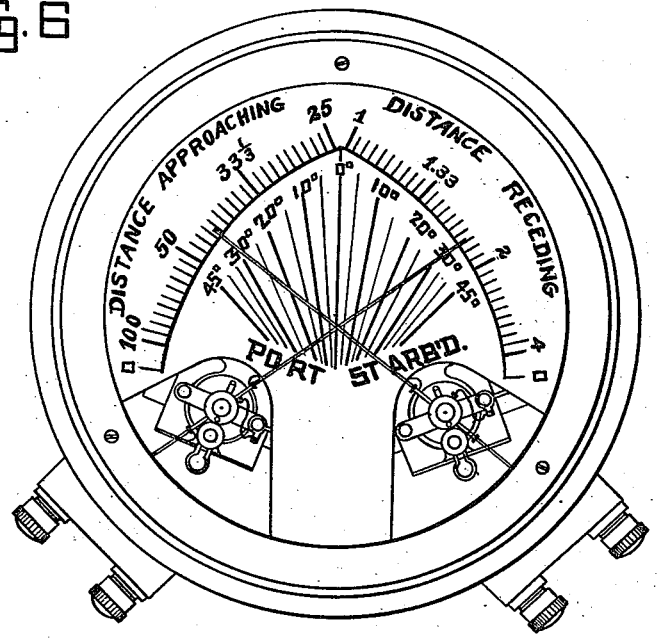
Figure 6 is a front elevation of one form of output meter construction used in my invention.

Loops 11 and 12 are electrically connected to individual radio receivers diagrammatically indicated at 13 and 14, Figure 9, respectively, each comprising means for obtaining tuned radio frequency amplification, detection and audio amplification. Radio receivers having a constant and equal input-output relationship over a wide range of input voltages must be used. Such a receiver, to be described in more detail hereinafter, is shown diagrammatically in Figure 8. These receivers are simultaneously tuned, but individually balanced by separate volume control adjustments, until their over-all amplification is equal; that is, equal input voltages will be amplified to produce equal output voltages in each receiver, and the amplifying power in one receiver is then the same as that of the other receiver. The output circuit of each receiver is connected to separate but identical alternating current measuring instruments, 15 and 16, but most advantageously rectifier type direct current voltmeters having a sensitivity of the order of 1,000 ohms per volt. These instruments, 15 and 16, are each provided with individual pointers 17 and 18 moving over individual scales 19 and 20, and the inter-related ratio or quotient scales 21 and 22. This is shown in more detail in Figures 6 and 7.

The measuring instruments, 15 and 16, are advantageously placed, in such a manner with respect to each other, that their pointers cross each other, that is, intersect substantially throughout their arc of movement, one instrument having a so-called zero left and the other a so-called zero right movement. The individual scales 19 and 20 are symmetrically arranged on a common card with respect to a bisecting line 23, hereafter referred to as the unity ratio line.

When equal potentials are applied to the instruments 15 and 16, their pointers 17 and 18 will be equally deflected and will intersect at some point along the line 23, which conforms to a unity ratio of potentials. When unequal potentials are applied to the two instruments, the pointers will be unequally deflected and will intersect on a potential-ratio line other than the unity ratio line 23. These ratio lines of potential 21, 22 and 23, as hereinafter explained, are calibrated in degrees representing the directional deviation of the transmitting beacon from a fixed line of reference, such as true north or the keel-line of the ship.

When a craft thus equipped, as shown in Figure 9, is headed for a radio beacon, receiver 13 connected to loop 11 will amplify the received signal a definite amount and operate indicator 15. Pointer 17 of indicator 15 will accordingly be deflected through an angle corresponding to the intensity of the signal received by loop 11. Receiver 14 connected to loop 12 will amplify the same signal received on its loop by the same amount and operate indicator 16. Pointer 18 will be deflected through an angle corresponding to the intensity of the signal received on loop 12. Receivers 13 and 14 are adjusted to have the same over-all amplifying power or gain throughout their range of operation so that whenever the energies absorbed by loops 11 and 12 are equal, the amplified current flowing in their respective indicators 15 and 16 are equal and pointers 17 and 18 will be defleced through equal angles, and when unequal the deflection will be proportional to the respective energies absorbed. This is true throughout the useful range of operation of the instrument as hereinafter more fully explained.

Thus when the vessel is headed for the radio beacon and the loop antennae 11 and 12 are symmetrically placed with respect to the keel-line, they will absorb equal amounts of signal energy; and their respectively associated receivers having been tuned and adjusted for equal gain, instruments 15 and 16 will deflect their pointers 17 and 18 through equal angles; the pointers thus intersecting on the unit ratio line 23.

If the vessel deviates from this course; for example, 10° to the left, the loop 12 will absorb more of the incoming energy than loop 11. As is well known in the art, the amount of energy absorbed by a loop antenna is proportional to the cosine of the angle between the plane of the loop antenna and the line of direction of the incoming signal.

Referring to Figure 9, indicator 16, connected to loop 12 through its receiver 14, will be subjected to a greater potential than indicator 15 connected to loop 11 through its receiver 13. Accordingly, pointer 18 will be deflected through a greater, and pointer 17 through a lesser angle and their intersection will occur on that one of the ratio lines 22 to the right of the unity ratio line 23 which corresponds to the deviation of the vessel. A navigator will thus be instantaneously and automatically informed that his vessel has deviated to the left or port side a definite number of degrees from its previous "head-on" course and that the beacon is now 10° off the starboard bow.

If the input-output relationship of each receiver is linear, the ratio between the output indications of the two indicators or meters 15 and 16 will be proportional to the ratio of the potentials induced in each loop.

Figure 7:
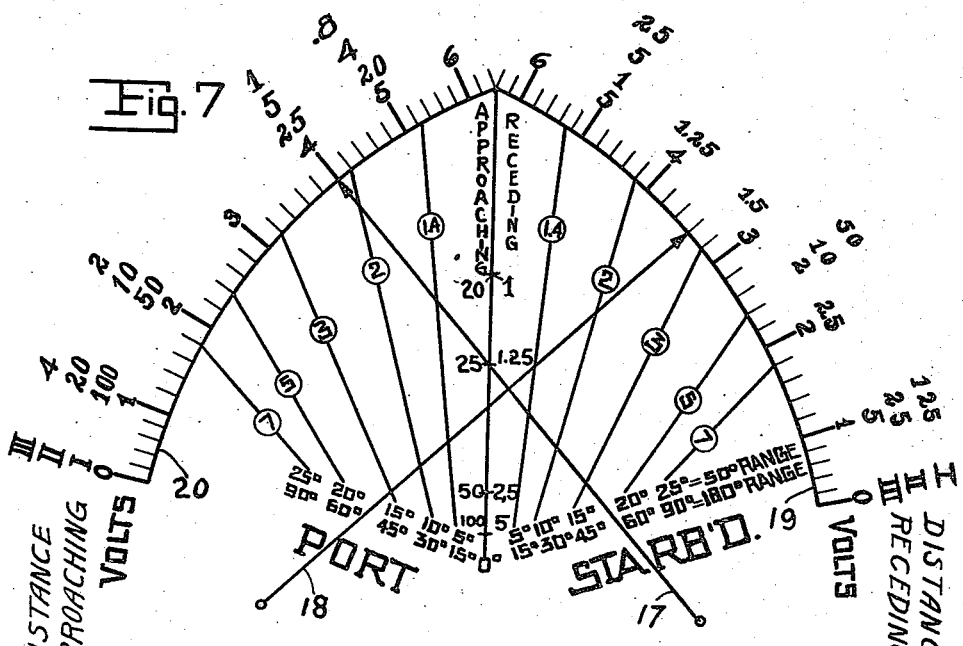
Figure 7 is a diagrammatic view of the face of one of the scales used in my invention.

Radial lines representing definite ratios of ouput voltages are drawn on a meter card common to the two instruments 15 and 16, and these lines are then calibrated in terms of directional deviation, as shown in Figure 7.

I have found, in practice, that with loops placed at right angles a 5° deviation is represented by the 1.4/1 ratio line; 10° deviation by the 2/1 ratio line; 15° deviation by the 3/1 ratio line; 20° deviation by the 4/1 ratio line; and 25° deviation by the 7/1 ratio line. The ratio lines in Figure 7 are marked with figures indicating these ratios or quotients.

Figure 2:
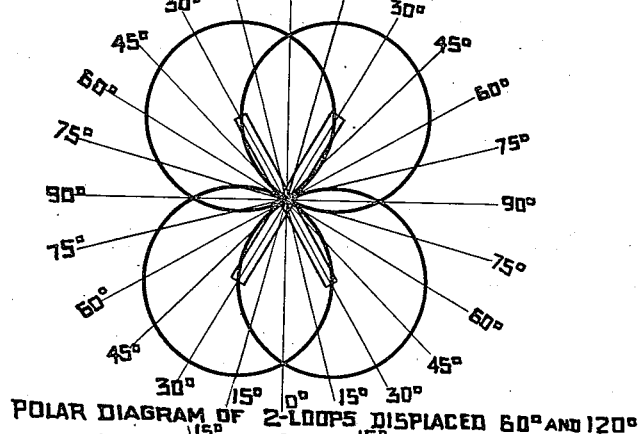
Figure 2 is a figure of eight polar diagram of two loops displaced 60° and 120°.
Figure 3:
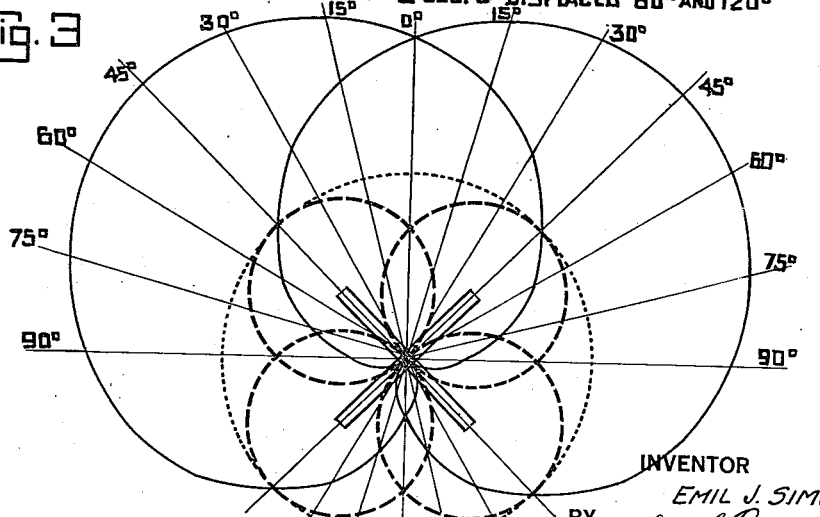
Figure 3 shows two cardioid polar patterns displaced 90°.

A set of curves comparing ratios of output potentials with angular deviation is shown in Figure 4 for loops displaced 60°, 90° and 120°, and for loops displaced 90° in combination with antennae properly adjusted to give a cardioid polar pattern. The directional deviations are plotted as abscissae and the voltage ratios as ordinates. The slope of these curves also depends upon the input-output characteristic of the receiver. In the case of Figure 4, the input-output exponential relationship of the receivers is 1.8. Thus, for example, with two loops displaced 90°, a 10° deviation produced an output voltage ratio of 2:1 and a 20° deviation produced a voltage ratio of 4:1. If the input-ouput relationship of the receivers is linear and alike, the slope of these curves can then be directly calculated from the voltage ratios induced in each loop as represented by the polar patterns of Figures 1, 2 and 3. When the input-output relationship of the receivers is not linear, these ratios should be multiplied by the exponential power of the amplifier in order to properly represent the ratio of the output voltages indicated by the meters 15 and 16.

As shown in Figure 7, the direction scale for loops at right angles is easily readable for deviations up to 25° to port or to starboard with non-linear amplifiers. For deviations beyond this value and up to the theoretical limit of 45°, where the ratio becomes infinite, the corresponding ratio lines become too crowded and are not easily readable.

When accurate bearings are desired at more than 30° off either bow, the entire double loop structure may, if desired, be rotated from its normal position on common shaft 41 (Figure 5 and Fig. 5a) until the pointers of the output meter again intersect on the unity ratio line.

Shaft 41 suitably suspended from structure 42 and rotatable with respect to sleeve 43 which is grounded at 44 also carries the loop terminals to their respective receivers, the loop terminals for each loop being suitably shielded from each other to prevent interaction. Strap 45 and insulating strap 46 of any suitable construction rigidly hold the two metallically shielded loops 51 and 52 in fixed angular relation, the shields being electrically open circuited and grounded. It will be understood, however, that all of this structure is shown diagrammatically and merely for the purposes of illustration.

The angle through which the loops are jointly rotated until the pointers of the two instruments intersect somewhere along the unity ratio line 23, represents the deviation of the signal source from the ship's bow. When correction for quadrantal error is necessary, this may be made from a correcting curve, or it may be automatically provided by means of a mechanical compensator of any suitable form.

Figure 1:
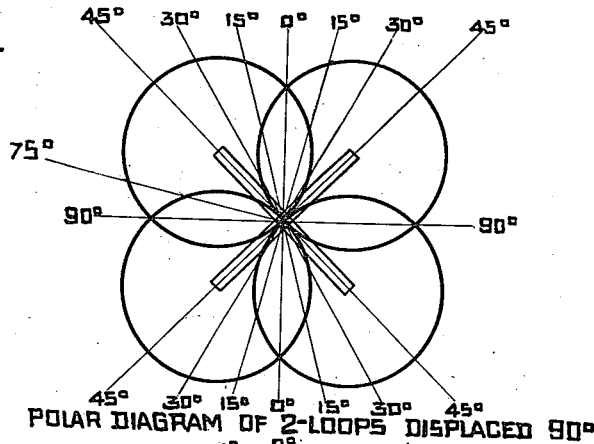
Figure 1 is a figure of eight polar diagram of two loops displaced 90°.

Referring to Figure 1, it will be noted that there is a symmetry of conditions in each of the four quadrants, resulting in a quadrantal ambiguity. However, on a rapidly moving ship this ambiguity disappears. Consider first the case of a signal coming from a beacon directly ahead. Such a signal would produce the same effect on the pointers as if the signal were 90° off bow, i. e. on the beam. In either case, the pointers of the output meters would cross on the unity ratio line 23, Figure 9. However, if the signal source is abeam, this condition of equality would last only momentarily, as the point of intersection would move rapidly either to left or to right as the ship advanced its position, depending upon whether the beacon is on the port or starboard beam. The time required to indicate this change in direction depends upon the ship's speed and its distance from the beacon. In the case of a ship traveling 10 miles an hour with the beacon on the beam 10 miles distant, a readily noticeable deviation of 5° would occur in approximately 5 minutes. In the case of an airplane traveling 100 miles an hour abreast of a beacon 50 miles distant, the 5° deviation would occur in just one-half that length of time.

It is quite apparent that this particular phenomena is of great utility to the navigator because it permits of a sharply defined, instantaneous and visible indication at the instant a moving ship is abreast of a radio beacon. Similarly, any other rapidly shifting bearing, such as a four point bearing commonly used in navigation, can be automatically indicated.

If the beacon is off the port bow, the 180° or "starboard quarter" ambiguity can be easily eliminated by noting for a few minutes the movement of the point of intersection of the pointers on the scale. If the ship is moving toward the beacon, the intersection of the pointers will gradually move up and further to the left of the ratio line corresponding to the direction of the beacon. If the beacon were off the starboard quarter, the point of intersection of the indicators would gradually move downward and to the right toward the unity ratio line.

The 180° ambiguity can thus be eliminated by observing whether the intersection of the pointers gradually creeps up or down on the scale, due to an increase or decrease in signal strength.

Another method of eliminating the 180° ambiguity is shown in Figures 8 and 18. Here each loop 51, 52, Fig. 8 or 53 and 54, Fig. 18, has connected to it (through the respective switches shown) a non-directional antenna 55, 56, Fig. 8, or 57, 58, Fig. 18, its absorbing power being adjusted to produce the well known cardioid pattern of radio frequency voltage in each receiver. The relation of input potentials in each receiver is shown for various directions in Figure 3, and the corresponding ratio curve for the output meters is shown in Figure 4. It will be noted that the useful angular range has been increased so that 90° off either bow may be read directly, without rotation of the loops. The accuracy of readings for small angular deviations, however, has been materially lessened. This is shown by the lower set of readings or 180° range of deviation in Figure 7.

An advantageous arrangement provides for two sets of output meters, one for operation with directional loop antennae only and calibrated to accurately indicate "head-on" or slightly "off bow" bearings; the other for operation with combined directional and non-directional antennae and calibrated to correctly indicate bearings much further off the bow or off either beam or quarter.

The 180° ambiguity is eliminated, either by physically rotating the combined loop structure through 180° and comparing the output meter deflections in each position, or by means of a switch which reverses the radio frequency potentials in the loops with respect to the antennae potentials. In either case, if both output meter readings are thereby diminished, it will indicate that the signal source is ahead and not astern.

Figure 4 compares the slope of the voltage ratio curve for various angles between the loops; viz: 60° 90° and 120°. With the loops at 60°, the 2/1 ratio line represents 17° deviation; with the loops at 90° to each other, the same ratio line represents 11° deviation; and with the loops at 120°, this ratio line represents only 7° deviation. When the loops are placed at any angle other than 90° to each other, they must either be so placed as to avoid inductive reaction upon each other, or else this reaction must be neutralized by means of an inductive coupling inserted between the two loops as shown at 61 in Figure 18. Capacitative coupling between loops and receivers must be avoided by completely shielding electrostatically each loop and its respective circuits.

When using a pair of loops set at 60° and 120° to one another (Figure 2), two separate sets of output meters may again be advantageously used. The scale of one meter is calibrated to indicate deviations from the bisecting line of one sector, and the scale of the other meter is calibrated to indicate deviations from the bisecting line of the adjacent or supplementary sector. A simple switch mechanism will simultaneously connect the related meter to the receivers and disconnect the unrelated meter.

This arrangement has the following advantages. When utilizing the 60° angle between loops, a wider useful arc is obtainable, especially useful when the beacon source is from 20° to 50° off either bow. Utilizing the supplementary angle of 120° between loops limits the useful range of observation to about 20° off either bow, but materially enhances the directional sensitivity in this narrowed range.

Furthermore, the ambiguity at complementary angles which exists when the loops are placed at right angles is eliminated. Similar potential ratios appear only at supplementary angles. This results from the fact that a signal coming from a direction that bisects the 60° sector has nearly twice the intensity of a signal coming from a direction bisecting the 120° sector. This is apparent from an inspection of the polar diagrams of Figure 2.

The accuracy of the device as a direction finder depends, as heretofore stated, upon maintaining equality of gain or sensitivity between the two receivers. This condition may be easily obtained in the system disclosed in Figures 8, 18 and 19. The loops shown in Figure 8 are connected together through a common resistance 65 of the order of 5 ohms and a tap from this resistance is made at the electrical center between the two loops. This tapped connection proceeds to the grounded side of the tuning condensers 66 and 67 through a resistance 68 of the order of 1,000 ohms provided with a short circuiting switch 69. When this switch 69 is open, the resistance 68 blocks the passage of high frequency current and causes the two loops to operate in series. The inductances of the loops 51 and 52 are made substantially alike; thus the condensers 66 and 67 will have equal capacities when tuned to resonate each loop with the incoming signal. The total potential produced across the two serially connected loops will be equally divided between the two condensers, thereby producing equal potentials, 180° out of phase, upon the control grids of the first radio frequency amplifying tubes 32 and 32' of each receiver. If the receivers have equal gain, then the two pointers of output meter 35 73 will intersect on the unity ratio line. If the output readings are unequal, the gain or sensitivity of either receiver is adjusted by means of its volume control, for example, such as designated by the reference 60 (Figure 19) until the outputs are balanced. The gains or sensitivities of both receivers will then be equal.

The switch 69 is then closed and the potentials induced in each loop can no longer combine and will be independently impressed upon the control grids of the respective amplifiers. The output meters will then indicate a ratio of output voltages corresponding to the ratio of voltages induced in each loop. At any time the switch 69 may be closed to recheck the relative gains or sensitivities of the two amplifiers, so as to assure balance.

In practice, I have found that the opening and closing of the switch 69 produces an objectionable impulse in the output indicators, and it is best to dispense with this switch and to make the resistance 68 in the form of a potentiometer, which may be quickly varied from zero to 1,000 ohms resistance, and shown at 70 in Figure 19.

Another way to balance the gain or sensitivity of the two amplifiers is to rotate each loop in turn until it is in line with the incoming signal. In that position a maximum and equal signal will be induced in each loop and the gain of either receiver may be adjusted to equalize the output voltages; or one loop placed at any angle to the signal source may alternately be connected across each amplifier and the gain of one receiver adjusted to give the same output as the other. These methods, however, are cumbersome and much slower than the switching method of balance described in the preceding paragraphs.

The receivers shown in Figure 8 each consist of two stages of tuned radio frequency amplification comprising screen grid input tubes 32, 33, and 75

32' and 33', respectively; detection by means of tubes 34 and 34', respectively; followed by one stage of audio frequency amplification represented by triodes 35 and 35', respectively. The outputs are applied through transformers 36 and 36' to my special indicators 73 through full wave copper oxide rectifiers 37 and 37', respectively, and series resistors or voltage multipliers 81 and 81', respectively. Input attenuators 72 and 72', respectively, are connected across loops 51 and 52 to permit reduction of the input voltages in equal predetermined steps upon the control grids of the input tubes 32 and 32', respectively. These attenuators serve to prevent the output voltages from exceeding the straight line portion of the input-output characteristic of the receivers.

Figure 18 shows a similar system utilizing two superheterodyne amplifiers. A single oscillator 92 supplies the local frequency which mixes with the incoming frequency to convert it into the intermediate frequency in the first stage of each amplifier 93 and 93', respectively, in the well known manner. In the preferred form of my invention, the mixing is done electronically in multi-grid amplifying tubes, as hereinafter described in connection with Figure 19. This arrangement eliminates magnetic coupling between receivers through the common oscillator circuit, thereby preventing any interaction between the receivers.

Subsequent stages of radio frequency tuning are at the intermediate frequency; in this instance, 465 kilocycles. Triode detectors 94 and 94' are used in combination with single stages of audio frequency amplification 95 and 95'. A non-linear input-output response characteristic is obtained with this arrangement, and if a linear input-output relationship is desired, the system shown in Figure 19 and hereinafter described is used.

The ability of the instrument to indicate slight change in signal strength is used to determine the distance or percentage distance of a moving craft from a fixed beacon. According to the attenuation law for long radio waves over salt water, the field strength varies inversely as the distance from roughly one wave length of the transmitting antenna to about 75 miles. For similar distances over land, a correction factor may have to be applied.

The ability of this instrument to measure distance or relative distance of a radio beacon from a moving ship depends, first, upon the extent to which the radiation from the beacon follows the known inverse-distance attenuation law and, second, upon maintaining a constant gain in the amplifying system.

I have found, in practice, as a result of a series of measurements taken at sea, that the inverse distance law applies accurately over salt water at wave lengths of the order of 1,000 meters for distances at least up to 50 miles.

The receiving and amplifying system must be carefully designed and constructed to maintain a constant gain throughout the period of observation. It should preferably have a linear amplifying characteristic with input voltages varying from 1 to 100 microvolts. For greater input voltages an input attenuator of $\frac{1}{10}$ and $\frac{1}{100}$ is used. The amplifier should have an overall linear gain, adjustable by volume control from $1 \times 10^5$ to $1 \times 10^6$ power.

The output meter should have a sensitivity of at least 1 volt per 1,000 ohms, and may read from 1–10 volts directly. It may have a multiplier of 5–1 allowing a maximum output voltage of 50 volts without overloading the amplifier, which overloading would cause the input-output relationship to become sub-linear.

In the preferred instrument, the linear portion of this attenuation law is used to directly indicate the percentage distance a vessel has traveled toward or away from a radio transmitting station.

Thus, for example, if a ship is heading toward a beacon, and if its distance from the transmitting beacon is X miles, the gain control of each receiver is adjusted until the pointers 17 and 18 are deflected equally and so that they intersect on the unity ratio line. The pointer 17 should be adjusted to read 100 on the approaching distance scale 84 (Figure 7) and pointer 18 to read 5 on the receding distance scale 82. The 100% position on scale 84 corresponds to a reading of 1 volt on the meter. As the distance to the transmitter is reduced to Y miles, the increased loop potentials, due to increased field strength, are proportionately applied through the amplifiers of Figures 8 or 18 to the instruments 15 and 16 of Figures 8 and 18 to correspondingly increase the deflection of pointers 17 and 18.

When the pointer 17 has reached 50 on scale 84 (Figure 7), it indicates that the input voltage impressed upon the loop has doubled and that therefore 50% of the initial distance from the transmitter has been traversed and 50% remains. When the pointer 18 has reached 25, which is equivalent to 4 volts the signal intensity has quadrupled and therefore $\frac{3}{4}$ of the initial distance has been traversed and 25% of the total distance remains. When this pointer reaches 5 on scale 84, 20% of the distance remains to be traversed. The limit of the instrument scale having now been reached, a series resistance 81 (Figure 8) is introduced in each output meter to reduce the readings to $\frac{1}{5}$ the former values. The pointer 17 will fall back to 100 which has now become a reading of 5 volts and a reading of 20 is noted on the second (II) distance scale. As the ship continues to travel toward the sending station, the pointer again moves toward the upper limit of the second distance scale, indicating at 4 that 4% of the distance remains to be traversed. A still higher resistance 83 can now be shunted across the output meters to further reduce their sensitivity by 5. This third distance scale (III) will cover a percentage range of from 4 to $\frac{8}{10}$%. When taking these readings, it is important that the pointers intersect on the unity ratio line.

If the initial distance X from the transmitter when the first reading was taken was 100 miles, the final reading of $\frac{8}{10}$% would represent a remaining $\frac{8}{10}$ of a mile. This is as close to within one wave length, assuming transmission on 1,000 meters, as it would be safe to follow the inverse distance attenuation law.

If the ship were headed in a direction equivalent to the drift angle and maintained this angle with respect to the beacon, the percentage distance readings would still apply, except that in taking these readings it would be necessary that in each instance the pointers cross along the radial line corresponding to this drift angle.

The distance "receding" scale 82 is used to indicate the relative distance from a beacon astern of the ship, that is, the relative distance as the ship recedes from the beacon. In this case the pointers 17 and 18 are adjusted to read equally near the top of the scale 82, marked III, and the resistance 83 is connected in circuit with the indicator (Figure 8) so as to provide for the highest output reading. As the ship recedes from the beacon, the pointer 17 will gradually move down this scale. When it has fallen to 2½ volts (times whatever multiplying value the series resistor 82 represents), the distance traversed will have been doubled since the initial reading. When the pointer has fallen to a reading of 1 volt (times the multiplier referred to above), five times the initial distance will have been traversed. Thereupon the series resistor 83 is removed from the circuit and resistance 81 substituted. A range of readings similar to those described in detail above, of from 5 to 25 times the initial distance, can be read on this second scale as the ship continues to recede, and by finally removing the resistance 81 the third distance range, of from 25 to 125 times the initial distance, can be read on the scale.

In accordance with my invention, I provide a combination of directional bearing and percentage distance indication upon the scale of one instrument. This provides the navigator with an immediate indication of the position of his ship with respect to a single radio beacon and inasmuch as the location of the beacon is known, the geographic position of the ship becomes fixed. Heretofore, it has only been possible to fix the position of a ship by means of triangulation, from bearings taken on two or more beacons. The system herein described permits the navigator to obtain his position from a single beacon immediately and automatically.

Another feature of my invention resides in indicating the course of the moving ship directly upon the scale of the instrument. This scale may be a chart or map of the territory over which the ship is traveling, drawn to polar coordinates. The radii must be drawn to a logarithmic scale in the direction of travel and the angles represent the bearing in degrees to the beacon or the point of destination. If the radii are drawn to a linear scale, the input-output relationship of the receivers must be logarithmic.

Figure 12:
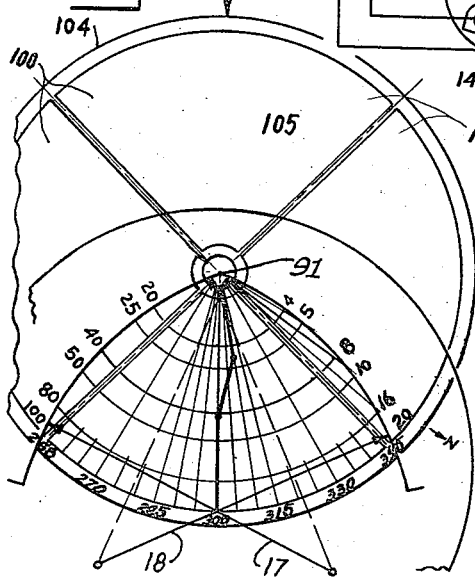
Figures 12 and 13 are diagrammatic views of a compass card or chart used in connection with my indicator for showing and recording the course of a vessel.
Figure 13:
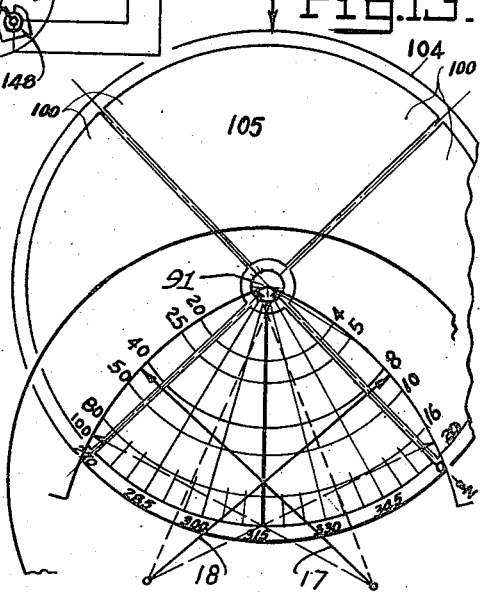

In Figures 12 and 13 the charts or maps are sectors 100 of a circular card 105, superimposed on a magnetic compass or giro repeater card 104, turning with the compass around the center 91. The intersection of the pointers will, in the absence of drift, follow the compass course to the beacon. For example, in Figure 12 the compass course to the beacon is 300° from north; but in Figure 13 the ship's course has changed to 315° from north, and the intersection of the pointers has also moved up on the scale to indicate progress toward the beacon. This change in the ship's course was made by the navigator to compensate for the ship's drift, due to a cross wind.

To enable the ship to follow a straight line course to the beacon, it must head into the wind an amount equal to the drift angle. Under such condition the pointers will continue to intersect on one of the ratio lines, other than the unity line. That ratio line represents the drift angle. If the pointer intersection shifts neither to the right nor left as the ship proceeds, but continues along this particular ratio line, the pilot knows he is flying directly for the beacon at the correct drift angle.

The intersection of the pointers will represent the position of the ship on the chart. When the intersection reaches the top of the card, 80% of the distance to the beacon will have been traversed. The navigator will then rotate the chart ¼ revolution on the compass card and an adjacent sector of the chart will become available directly beneath the movement of the pointers. The range of this second chart will be from 80% to 96% of the initial distance to the beacon and the radii must therefore be drawn to five times the scale of the previously used chart. The angular degrees, representing the geographic direction to the beacon, are the same in each chart.

For the return flight, the remaining two quadrants of the card are used, one quadrant representing from 0% to 80% of the distance, and the other quadrant from 80% to 96% of the total distance. A complete card containing the four charts, one in each quadrant, may be drawn to cover a specific and from a given beacon. In such cases the actual mileage to and from the beacon may be substituted for the percentages. Oversea the chart may be calibrated directly in latitude and longitude. Additional charts covering different courses to and from the same beacon, or to and from other beacons, may be carried on the ship and the particular card representing the course to be flown may be properly inserted in the instrument. It is to be understood that the chart in use is affixed to and turns with the magnetic or giro compass card.

In Figure 17 I have disclosed apparatus for automatically recording the ship's course on a compass card as it proceeds toward the beacon. The instrument 101 is similar to that described hereinbefore, except that the pointers 102 and 103 are placed on opposite sides of the compass card 104 which always maintains its true position with respect to geographical north. This card is made of specially treated paper suitable for chemical recording, as is well known in the telegraphic art. The pointers 102 and 103 are connected to the opposite terminals of a source of electrical potential sufficiently high to permit the intermittent passage of a spark between the pointers at their intersection and through the chemically treated card. Any suitable make and break device may be used to produce an intermittent spark at intervals of 1 to 5 minutes as shown diagrammatically at 109. When the spark occurs, it discolors the chemically treated paper at the point where the pointers intersect, and the loci of these points, produced by successive sparks, marks the course of the ship on the card. As will be well understood, the chart is drawn to polar coordinates, one coordinate representing compass degrees and the radial lines representing either actual distances from a certain beacon or percentage distance from any beacon, each drawn to logarithmic scale.

In a further application of the above principle, I provide rectilinear cross section paper moving by clock-work across the meter scale from left to right at a predetermined rate, the abscissa scale representing units of time. The ordinates of the cross section scale are drawn logarithmically to record the percentage distance traveled. It may be calibrated into actual miles whenever the initial distance in miles from the beacon is known. The slope of the line formed by the locus of dots, recorded as described above, is an indication of the ship's ground speed in miles per hour.

Figure 15:
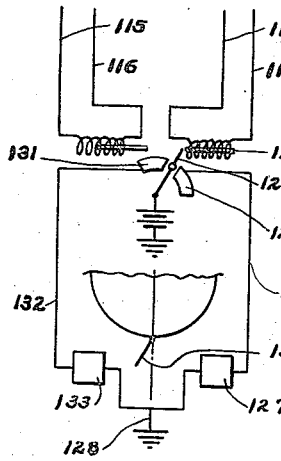
Figures 14 to 16 are circuit diagrams showing my invention for automatically controlling a rudder.
Figure 16:
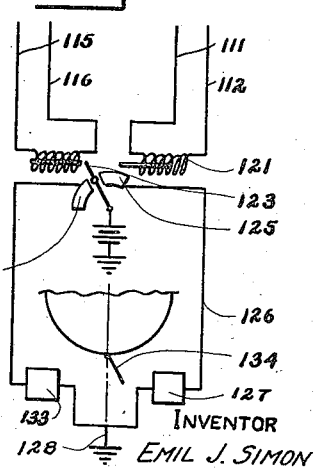

As the ratio of the output voltages is a function of the ship's course toward a known radio beacon, this principle can be utilized to directly control the ship's rudder and for automatically maintaining the ship on a predetermined course by mechanism disclosed in Figures 14, 15 and 16 and to be described in the following.

Figure 14:
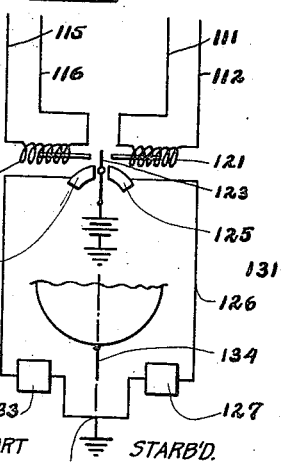

In Figure 14 I have disclosed conductors 111 and 112, which multiple with the conductors 113 and 114 of Figure 8, or may be connected in place thereof. Similarly, conductors 115 and 116 are connected in multiple with conductors 117 and 118, or may be connected in place of these conductors. Conductor 112 is connected to windings 121 of a differential relay and conductor 115 is connected to the winding 122 of the same differential relay. When the vessel is heading directly toward the beacon, the currents flowing in conductors 111, 112 are substantially equal to the currents flowing in conductors 115, 116, it being assumed that the amplifiers have previously been balanced as heretofore described. In this condition the effect of the differential windings 121 and 122 balance each other and the armature 123 remains ineffective.

In the event of the vessel changing its course slightly to the right, the current flowing in the conductors 111 and 112 increases and at the same time currents flowing in conductors 115 and 116 decrease. As a result, armature 123 is deflected to the right by the magnetic action of the winding 121 as shown in Fig. 15 and will engage the segment 125. Segment 125 is mounted for rotation in a manner to be described hereinafter and is connected over the conductor 126 to a relay 127, the opposite terminal of which is grounded at 128. A second segment 131 mounted on the same shaft with segment 125 is connected over the conductor 132 to a relay 133, similarly grounded at 128, and coacting with relay 127 to control the rudder 134.

As described above, the armature 123 has been moved into engagement with the segment 125 and thereupon completes an energizing circuit through the relay 127. Relay 127 upon energization operates the rudder 124 through suitable power mechanism to move it about its pivot in a counterclockwise direction. The vessel which has veered to the right swings back to the left. Simultaneously with the movement of the rudder, the segments 125 and 131 suitably mechanically connected thereto are rotated in a clockwise direction until segment 125 is disconnected from the armature 123 as shown in Figure 15. As a result, the circuit through relay 127 is opened and the rudder 134 is automatically restored to its original position as shown in Figure 14. At the same time distributor segments 125 and 131 are restored to normal.

If at this time the vessel is again heading directly toward the beacon, the currents flowing in conductors 111 and 112 will be substantially equal to the currents flowing in conductors 115 and 116, and the conditions shown in Figure 14 will again obtain. If, on the other hand, the ship has not returned to its original course, or has swung too far, the above described operations will be repeated, except that in the latter case, the currents in conductors 115 and 116 will increase and currents in conductors 111 and 112 will decrease so that an energizing circuit is completed from armature 123 in engagement with segment 131 through relay 133 operating the rudder 134 in the reverse direction as shown in Figure 16. It will be understood that a predetermined lag will be introduced between the movement of the rudder 134 and of the distributor segments 125 and 131 to permit a sufficient interval for the application of the rudder.

In direction finding, when operating on the minimum or maximum signal or when utilizing the automatic means and method disclosed in this application, it is desirable to have a linear input-output relationship in the amplifying receiver. Experiment has shown that such a relationship cannot readily be secured if more than one stage of audio amplification is employed. When detection is of the triode or pentode type, one stage of audio amplification will destroy linearity. This is probably due to the fact that triode detectors amplify the rectified signal. The resulting audio amplitude distortion is probably the result of audio frequency interaction between the first and second stages, but the effect is clear even if the cause has not definitely been ascertained.

I have discovered that I can obtain linear amplification either by employing triode detection with no audio amplification or by using a diode detector and only one audio stage in the output. Linear amplification is destroyed in either case if another audio stage is added. The curves made show a deviation from linearity of 1.5 to 2 in exponential relationship, depending on the type of tubes and the grid biases used.

The addition of a second stage of audio amplification with triode detection, or of a third stage with diode detection, does not seem to materially increase the non-linearity of the response. I attach considerable significance to this discovery in any phase of the radio or acoustic art requiring linear amplification. There is no doubt that a non-linear response in an audio amplifier will impair fidelity due to unequal amplification of fundamentals and harmonics.

Simplification of tuning the dual receivers used herein is a highly desirable accomplishment. Inaccurate tuning of either receiver obviously requires re-balance. The superheterodyne has a distinct advantage in this respect. A single oscillator suffices for the two receivers. The preferred manner of feeding the oscillator voltage to each receiver without causing coupling between receivers is by using electronic modulation. In this respect it differs from the modern practice of combining in one tube the function of oscillator and radio frequency amplifier. However, the same type of tube may be used to accomplish this result.

Among the precautions I have found it necessary to take to prevent interaction between receivers and between receiver and oscillator have been the following:

1. Complete shielding of oscillator tube, coil and circuit and the proper bypassing of circuits connected therewith.

2. Proper bypassing of all direct current potential sources.

3. The radio frequency and audio currents of the respective receivers must not interact upon each other and I find that this is best accomplished by the use of choke coils and bypassing condensers suitably placed.

The preferred system for accomplishing these results is disclosed in Figure 19. As shown, it consists of two circuits 131 and 132 operated from a common oscillator 133. The loop circuits are tuned by individual sections of a three section variable condenser 134 and 135. The third section 136 tunes the oscillator circuit 137. The radio frequency potential developed in each tuned loop is applied directly to the control grids of two pentagrid converters 138 and 139. The action of these tubes in converting a radio frequency to an intermediate frequency depends on the independent control of the electron stream by the electrodes connected with the oscillator circuit, and the grid to which the radio frequency signal is applied. Since the electron stream is the only connecting link between the two control electrodes, the converters 138 and 139 may be said to be "electron-coupled". This arrangement offers advantages in eliminating undesirable intercoupling effects between the signal, oscillator and the mixer circuit. This is important inasmuch as there must not be any coupling between the two receivers 131 and 132. The pentagrid converters 138 and 139 are not used as composite oscillators in order to avoid using two separate oscillator circuits. By utilizing one oscillator for both amplifiers, the problems connected with frequency tracking are thus avoided. Inasmuch as both loop circuits are rather broadly tuned, the oscillator is the determining factor in selecting the proper incoming frequency.

When tuned radio frequency circuits were connected with the previously designed and constructed apparatus (see Figure 8), considerable difficulty was encountered in keeping the three tuning condenser sections of each receiver in line.

The pentagrids 138 and 139 feed tuned grid tuned plate intermediate frequency to transformers 141 and 142, respectively, which in turn are connected to pentodes 142' and 143. These tubes have a gain of approximately 1500. The following tuned grid tuned plate intermediate frequency is connected to the pentode section of tubes 144 and 145. These tubes consist of a double diode and pentode independent of each other except for a common cathode sleeve all within one envelope. The pentode section is here employed as an intermediate frequency amplifier. The following intermediate frequency transformers have tuned primary plate windings with untuned secondaries feeding the diode section of tubes 144 and 145. A resistance coupled audio stage follows in each circuit with output pentode tubes 148 and 149. The outputs of both receivers are fed to the independent movements of the twin output meter, hereinbefore described, and the linear input-output characteristic, hereinafter described, is thus obtained.

Although for purposes of illustrating the principles of my invention, I have disclosed in detail apparatus and circuits for carrying out my invention, it will be understood that both the circuits and apparatus may be modified without departing from the spirit of my invention. Thus while I have described a system operating on the standard beacon wave of the order of 1,000 meters now used chiefly for direction finding, it will be obvious that the principles of my invention can be also applied to systems operating on short or quasi-optical waves, using dipoles as directive antennae.

Although I have disclosed two directional antennae for receiving the signals, other arrangements, such as two non-directional antennae may be used in connection with two or more transmitting sources for determining distance or direction, or both.

Moreover, the basic principle of my invention which is directed to a navigational system may be equally well used for detecting the source or direction of a sound transmitting source. This I have diagrammatically illustrated in Figure 11, in which I have disclosed two directional ribbon microphones 141 and 142, of the type disclosed on page 336 of the November, 1932 issue of Electronics, published by the McGraw-Hill Co. of New York. These microphones suitably mounted at predetermined angles with respect to each other are connected over individual circuits 143 and 144 and through their respective audio amplifiers 145 and 146 to their individual indicator devices 147 and 148 operating pointers 149 and 150, respectively. Audio amplifiers 145 and 146 and indicators 147 and 148 may be substantially like those described hereinbefore in connection with radio direction finding.

The source of a signal, such as a fog horn, may now be directly indicated on the indicating pointers, the operation of the device being substantially like that described above in connection with Figure 9. Depending upon the direction of the sound waves, the respective amounts of sound energy picked up by the ribbon microphones 141 and 142 will either be the same or different. If the source is directly ahead and in line with the unity line 151, both microphones 141 and 142 will pick up the same amount of energy which will first be translated into electrical energy flowing over the circuits 143 and 144. Amplifiers 145 and 146 will amplify the sounds equally and the indicators 147 and 148 will be operated to deflect the pointers 149 and 150 equally, so that they intersect along the unity line 151. If, on the other hand, the source of the sound is to the right of the reference line 151, microphone 142 will pick up more of the energy than 141 and will correspondingly cause a larger operation of the indicator 148 than of indicator 147. Pointer 150 will be deflected to a greater degree and the point of intersection of pointers 149 and 150 will accordingly occur somewhere along the right of reference line 151. This point of intersection will be calibrated to indicate the direction to the sound source in degrees to the right or left of reference line 151.

Similarly, other forms of radiant energy, such as heat or light waves, may be picked up by angularly disposed thermal or photo electrical devices and a resultant indication produced to indicate the direction to the source of that energy.

Among other navigational uses to which my invention can be applied is that of preventing collisions between crafts, such as vessels at sea, or airplanes during periods of low visibility. If one of the crafts carries a transmitter, the other vessel can, as has been explained in detail hereinbefore, determine the direction and relative distance to that craft. By proper steering, he may easily avoid that craft and maintain a safe distance. When the other craft is abreast, the pointers will cross on the unity line, as will be clear from the description hereinbefore, and any slight variation from this position will cause a sharp lateral deflection of the intersection of the pointers.

It is also possible for a craft to circle at a fixed radius around any transmitting source by merely keeping the intersection of the pointers on the unity ratio line, indicating that he is always abreast of the transmitting point. When a group of ships or aircraft, traveling in a squadron, desire to keep abreast of each other, when spaced apart a distance beyond visibility, this is readily possible according to my invention if the craft in command is equipped with a transmitter. The remaining craft esuipped with devices operating according to my invention will merely have to keep the pointers intersecting at the unity ratio line to keep abreast of the commanding craft, and by keeping the pointers at the same output level maintain constant spacing between ships.

It will thus be obvious to those skilled in these arts that there are many other adaptations of my invention not necessarily limited to navigation, such as the instantaneous comparison of any two similar power absorbing devices, or the comparison of the relative intensities of two or more energy sources on a single scale. All of these are possible because of the automatic feature which provides instantaneous indication of direction, and where desired, of drift, distance and speed.

Figure 11:
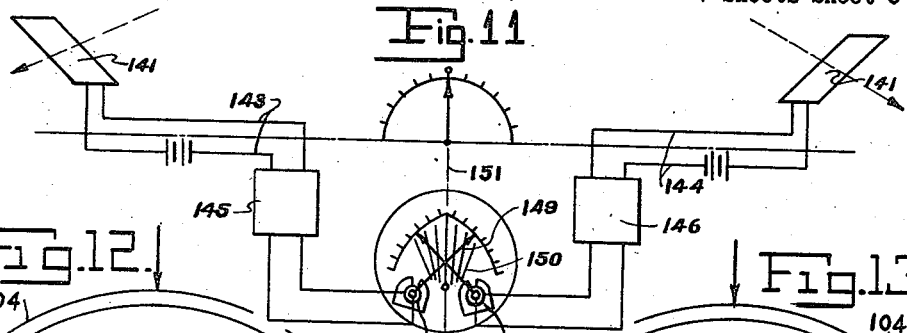
Figure 11 is a circuit diagram showing my invention as applied to detecting sound signals.

For example, the two microphones 161 in Figure 11 might be replaced by photo-electric cells to compare the effect of a single source of light on each cell through the joint action of output meters 147 and 148. Such an arrangement might be utilized in photometry to compare the relative intensities of two sources of light, one of which may be a standard of illumination.

While I have disclosed a specific form of indicator, it will be obvious that it may take other forms and the pointers may move over different ranges. Thus I may arrange the pointers for edgewise operation, so that when they move parallel, they provide the same indication as the pointers intersecting on the unity line provide in the above description, and when they form an angle with each other, that angle may represent the deviation of the transmitting source. I do not intend to be limited by the specific applications I have given herein for illustration, nor by the specific apparatus I have disclosed for the purpose of indicating how my invention may be carried out, but only as set forth in the appended claims.

I claim:

1. The method of radio navigation, comprising receiving a radio signal simultaneously in a plurality of angularly displaced directional antennae; simultaneously and independently amplifying the signal received by each antenna equally; simultaneously and independently measuring the strength of each of said amplified signals; and utilizing the respective signal strength to determine both the direction of and distance from said source of radio signals in a single indication.

2. The method of indicating the direction from a point to a source of waves, which includes continuously, simultaneously and independently producing from said waves a plurality of electric currents each of which bears a predetermined relation with the direction of said source, amplifying said currents separately, separately rectifying each current, equalizing the amplifications of said currents, and simultaneously producing by the rectified currents a single unitary indication of the direction and intensity of said waves.

3. A radio direction finder, comprising a plurality of directional antennae grouped together and angularly displaced; means for continuously and simultaneously measuring the relative potentials impressed on each of said antennae by a radio signal; and a chart cooperating with said means to automatically indicate the ratio of said measured potentials; said ratio representing the angular deviation of the source of said signal from a given line.

4. A radio direction finder, comprising a plurality of directional antennae grouped together and angularly displaced; means for continuously and simultaneously measuring the relative potentials impressed on each of said antennae by a radio signal; and a scale cooperating with said means to automatically indicate the distance to said transmitting station.

5. A radio direction finder comprising a plurality of angularly displaced directional antennae; means for continuously and simultaneously measuring the potentials induced in each of said antennae by a radio signal; and a dial cooperating with said measuring means calibrated to indicate the ratio of said measured potentials; said ratio representing the angular deviation of the source of said signal from a given line.

6. A radio direction finder comprising a plurality of electrically decoupled directional antennae angularly displaced; means for continuously and simultaneously measuring the relative potentials impressed on each of said antennae by a radio signal; and a dial cooperating with said means and calibrated to indicate the ratio of said measured potentials; said ratio representing the angular deviation of the source of said signal from a given line.

7. A radio direction finder comprising a plurality of electrically decoupled directional antennae placed to form an acute angle; means for continuously and simultaneously measuring the relative potentials impressed on each of said antennae by a radio signal; and a dial cooperating with said means and calibrated to indicate the ratio of said measured potentials; said ratio representing the angular deviation of the source of said signal from a given line.

8. A radio direction finder comprising a plurality of directional antennae angularly displaced; means comprising electrically isolated identical amplifiers connected to said directional antennae; means for continuously and simultaneously measuring the relative potentials impressed on each of said antennae by a radio signal; and a dial cooperating with said means and calibrated to indicate the ratio of said measured potentials; said ratio representing the angular deviation of the source of said signal from a given line.

9. A radio direction finder comprising a plurality of directional antennae angularly displaced; means comprising decoupled amplifiers having linear input-output characteristics connected to each of said antennae; means for continuously and simultaneously measuring the relative amplified potentials impressed on each of said antennae by a radio signal; and a dial cooperating with said means and calibrated to indicate the ratio of said measured potentials; said ratio representing the angular deviation of the source of said signal from a given line.

10. In combination; a transmitting station; a radio direction finder comprising a plurality of directional antennae angularly displaced; means for continuously and simultaneously indicating the relationship of the respective potentials impressed on each of said antennae by the energy radiated from said transmitter, a set of scales, each cooperating with said indicating means; one of the said scales being graduated for relative distances to the said transmitting station and the other of said scales being graduated for relative distances from said transmitting station, and means for changing the setting of said indicating means according to the scale with which it is to cooperate.

11. In a radio navigational system, a transmitting station; a receiving station; one of said stations being movable with respect to the other; said receiving station comprising a pair of antennae each arranged to simultaneously and continuously absorb only the magnetic component of the radiant energy from said transmitting station; means for simultaneously utilizing the absorbed energy of both antennae to determine the directional line to said station, said means including means for measuring the relative change of said absorbed energy as said movable station travels along the directional line, and an indicator with a percentage distance scale associated with said measuring means.

12. A radio receiving system for determining the direction of arrival of an electromagnetic wave comprising a pair of fixed directional antennae substantially decoupled from each other; separate receiving channels including identical amplifiers connected to said antennae and electrically isolated from each other; a ratio indicator comprising a pair of measuring instruments each connected to the output of one of said channels and having a common dial calibrated to indicate the directional deviation of the electromagnetic wave from a predetermined line.

13. A radio receiving system for determining the direction of arrival of an electromagnetic wave comprising a pair of fixed directional antennae substantially decoupled from each other; separate receiving channels including identical amplifiers connected to said antennae and electrically isolated from each other; and a ratio indicator comprising a pair of measuring instruments each connected to the output of one of said channels and having a common dial; the pointers of said instruments being arranged to move in opposite directions and intersecting over said dial; said dial being calibrated to indicate the directional deviation of the electromagnetic wave from a predetermined line.

14. A radio direction finder for determining the direction of arrival of a radio wave, said finder comprising a pair of receiving channels, each having an input and an output end, and each including an amplifier and a rectifier, said amplifiers having substantially equal gain characteristics, a pair of antennae at least one of which is directional, each being arranged to develop a potential from the received radio wave and normally to impress a potential on the input end of its respective receiving channel, means for temporarily deriving from said antennae and impressing on the respective input ends potentials having a known ratio to each other, a meter in electrical communication with the output ends of both receiving channels, and arranged to indicate continuously the ratio of the potentials at such output ends, said meter having a dial calibrated to show directions corresponding to indicated ratios, and means for adjusting the ratio of the potentials at the output ends to cause the meter to indicate the known ratio of the temporarily impressed potentials at the input ends.

15. A radio direction finder for determining the direction of arrival of a radio wave, said finder comprising a pair of receiving channels, each having an input end and an output end, and each including an amplifier and a rectifier, said amplifiers having substantially equal gain characteristics, a pair of substantially decoupled directional antennae arranged to be set at a predetermined angle to each other, each being arranged to develop a potential from the received radio wave and normally to impress a potential on the input end of its respective receiving channel, said antennae having substantially equal efficiencies, means for temporarily deriving from said antennae and impressing on the respective input ends potentials having a known ratio to each other, a meter in electrical communication with the output ends of both receiving channels and arranged to indicate continuously the ratio of the potentials at such output ends, said meter having a dial calibrated to show directions corresponding to indicated ratios, and means for adjusting the ratio of the potentials at the output ends to cause the meter to indicate the known ratio of the temporarily impressed potentials at the input ends.

16. In a radio navigational apparatus, the combination, with a pair of antennae arranged to develop a pair of differing potentials from a single radio transmitting station, said potentials being determinative of the direction of said station, a meter energized by both potentials and arranged to indicate continuously and simultaneously, the bearing of the radio station and a dimension which is a function of both of said voltages, and means for regularly and consecutively recording the indication of said meter in polar coordinates, one being the bearing angle and the other representing distance of the station.

17. In a radio navigational system, a transmitting station, a receiving station, the receiving station being movable with respect to the transmitting station, said receiving station comprising a pair of differently oriented directional antennae, each arranged to simultaneously and continuously absorb only the magnetic component of the radiant energy from said transmitting station, and means for simultaneously utilizing the absorbed energy of both antennae to determine the directional line to the transmitting station, said means including two indicating devices, each having a pointer, said pointers being arranged to intersect to give a single unitary indication representing said directional line and also the substantial reduction in energy due to the receiving station passing over the transmitting station.

18. In a radio navigational apparatus, the combination, with a pair of antennae arranged to develop a pair of differing potentials from radiant energy transmitted from a single source, said potentials being determinative of the direction of said source, of a meter energized by both potentials comprising two indicating devices arranged to provide an intersection point giving in a single unitary indication, the bearing of the source and a dimension which is a function of both of said potentials.

19. A radio receiving system for determining the direction of arrival of an electromagnetic wave, comprising a plurality of fixed directional antennae substantially decoupled from each other; separate receiving channels including identical amplifiers connected to the said antennae and electrically isolated from each other; means for balancing the amplifying power of the separate amplifiers, including means for temporarily combining the outputs of the several antennae and applying predetermined equal parts thereof to the input of both of said receiving channels; and a meter connected to the output of said channels for comparing the outputs and calibrated to indicate the directional deviation of the electromagnetic wave from a predetermined line.

20. A radio receiving system for determining the direction of arrival of an electromagnetic wave, comprising a pair of fixed directional antennae positioned to prevent detrimental magnetic interaction with each other; means for protecting each antennae against the action of any electrostatic field external to itself, while permitting electromagnetic components of a radio wave to act on both antennae simultaneously; separate receiving channels including amplifiers of equal gain having linear input-output characteristics, connected to the respective antennae and electrically isolated from each other in respect to all usable frequencies; a pair of movable coils, each arranged to be separately energized from the output of its respective channel, means for producing a steady unidirectional magnetic field for each coil, and a pair of indicating devices one for each coil and arranged to be actuated by its respective coil, said indicating devices being located relative to each other so as to provide an intersection point giving a single unitary indication representing direction and intensity.

21. A radio receiving system for determining the direction of arrival of an electromagnetic wave, comprising a pair of fixed directional antennae positioned to prevent detrimental magnetic interaction with each other; means for protecting each antennae against the action of any electrostatic field external to itself, while permitting electromagnetic components of a radio wave to act on both antennae simultaneously; separate receiving channels including amplifiers connected to the respective antennae and electrically isolated from each other in respect to all usable frequencies; means for balancing the amplifying power of the separate amplifiers; a pair of movable coils, each arranged to be separately energized from the output of its respective channel, means for producing a steady unidirectional magnetic field for each coil, and a pair of indicating devices one for each coil and arranged to be actuated by its respective coil, said indicating devices being located relative to each other so as to provide an intersection point giving a single unitary indication representing direction and intensity.

22. A radio direction finder for determining the direction of arrival of a radio wave, said finder comprising a pair of receiving channels, each having an input end and an output end and each including an amplifier and a rectifier, said amplifiers having substantially equal gain characteristics, a pair of directional antennae positioned to prevent detrimental magnetic interaction with each other and arranged to be set at a predetermined angle to each other, each being arranged to develop a potential from the received radio wave and to impress a potential on the input end of its respective receiving channel, said antennae having substantially equal efficiencies, means for protecting each antennae against the action of any electrostatic field external to itself while permitting the electromagnetic components of a radio wave to act on both antennae simultaneously, and a meter in electrical communication with both outputs of the receiving channels and having two pointers positioned to cross each other to give an intersection point giving a single unitary indication of direction and intensity of said radio wave, said meter having a dial calibrated to show said direction and intensity as indicated by said intersection point.

23. In a navigational craft, a plurality of directional antennae mounted on said craft at an angle to each other and arranged to receive simultaneously signals from a single non-directional transmitting station, and develop separate potentials therefrom, a pair of movable coils, means for producing a steady unidirectional magnetic field for each coil, means for separately energizing each coil from its respective separate potential aforesaid, and a pair of indicating devices, each actuated by its respective coil, said indicating devices being positioned relatively to provide an intersection point giving a single unitary indication of the strength and direction of arrival of said signals.

24. A radio receiving system for determining the direction of arrival of an electromagnetic wave, comprising a pair of directional antennae positioned to prevent magnetic interaction with each other, means for protecting each antenna against the action of any electrostatic field external to itself, while permitting electromagnetic components of a radio wave to act on both antennae simultaneously, separate receiving channels including amplifiers of equal gain characteristics, each in electrical communication with its respective antenna and electrically isolated from each other in respect to all usable frequencies, a pair of movable coils, each coil being in independent electrical communication with the output of its respective receiving channel, means for producing a steady unidirectional magnetic field for each coil, and a pair of indicating devices, one for each coil and arranged to be actuated by its respective coil, said indicating devices being located relative to each other so as to provide an intersection point giving a single unitary indication representing direction and intensity.

25. In a radio navigational system, a transmitting station, a receiving station, one of said stations being movable with respect to the other, said receiving station comprising a pair of differently oriented directional antennae, each arranged to simultaneously and continuously absorb only the magnetic component of the radiant energy from said transmitting station, means for simultaneously utilizing the absorbed energy of both antennae to determine the directional line to said station, said means including means for measuring the relative change of said absorbed energy, indicating means associated with said measuring means, a non-directional antenna, and means for electrically connecting it with the direction-determining means, to establish the direction of travel of the movable station relative to the other station.

26. In a directional receiving system comprising a plurality of separate amplifying channels each fed from a separate source of energy, the method of obtaining equality of amplification in each channel which consists in combining the energies from each source; applying a predetermined and equal portion of the combined energy to each amplifying channel; determining the strength of each portion after amplification through each channel; adjusting the amount of amplification in each channel until equal strengths of the amplified energies are obtained and applying the individual energy of each source to its respective amplifying channel.

27. A radio receiving system for determining the direction of arrival of an electromagnetic wave, comprising a plurality of fixed directional antennae substantially decoupled from each other; separate receiving channels including identical amplifiers connected to the said antennae and electrically isolated from each other; means for balancing the amplifying power of the separate amplifiers, including means for connecting the directional antennae temporarily in series and applying to the input of both of said receiving channels predetermined equal parts of the sum of the potentials developed in said antennae; and a meter connected to the output of said channels for comparing the outputs and calibrated to indicate the directional deviation of the electromagnetic wave from a predetermined line.

28. In a direction finder, the combination with a plurality of antennae, of separate amplifying channels normally connected to the respective antennae; means for adjusting the relationship of the sensitivities of the channels, means for determining the relationship of said sensitivities, said means comprising means for combining the outputs of said antennae and applying said combined output to each channel to permit determination of said relationship.

29. In a direction finder, the combination with a plurality of antennae, of separate amplifying channels normally connected to the respective antennae; means for equalizing the sensitivities of the channels and means for combining the outputs of said antennae and applying said combined output to each channel to permit determination of said equality.

EMIL J. SIMON.